US008630585B2

(12) United States Patent
Jolivet

(10) Patent No.: US 8,630,585 B2
(45) Date of Patent: Jan. 14, 2014

(54) METHOD AND APPARATUS FOR COMMUNICATING WITH EXTERNAL INTERFACE DEVICE USING CONTACTLESS

(75) Inventor: Paul Jolivet, Paris (FR)

(73) Assignee: LG Electronics Inc., Seoul (KR)

( * ) Notice: Subject to any disclaimer, the term of this patent is extended or adjusted under 35 U.S.C. 154(b) by 234 days.

(21) Appl. No.: 13/063,573

(22) PCT Filed: Sep. 23, 2009

(86) PCT No.: PCT/KR2009/005414
§ 371 (c)(1),
(2), (4) Date: Mar. 11, 2011

(87) PCT Pub. No.: WO2010/036017
PCT Pub. Date: Apr. 1, 2010

(65) Prior Publication Data
US 2011/0171907 A1    Jul. 14, 2011

Related U.S. Application Data

(60) Provisional application No. 61/099,879, filed on Sep. 24, 2008.

(51) Int. Cl.
*H04B 5/00* (2006.01)
(52) U.S. Cl.
USPC ...... 455/41.1; 455/41.2; 455/456.1; 235/380; 235/439

(58) Field of Classification Search
USPC ............ 455/41.1, 41.2, 456.1, 558; 235/380, 235/439, 441, 492
See application file for complete search history.

(56) References Cited

U.S. PATENT DOCUMENTS 7,257,108 B2 *  8/2007  Cheston et al. ............... 370/338

FOREIGN PATENT DOCUMENTS

| JP | 2005-064923 | | 3/2005 | |
| JP | 2006-221452 | * | 8/2006 | ............... G06F 1/00 |
| KR | 10-2007-0063117 | * | 6/2007 | ............... H04B 1/40 |
| KR | 10-2007-0092390 | | 9/2007 | |

* cited by examiner

*Primary Examiner* — Tuan H Nguyen
(74) *Attorney, Agent, or Firm* — Morgan, Lewis & Bockius LLP

(57) ABSTRACT

A method and apparatus for contactless communication are discussed. According to an embodiment, the invention provides a mobile terminal comprising a contactless module configured to communicate contactlessly with an external device; and a controller configured to control the contactless module of the mobile terminal to detect a contactless module of the external device, to identify the external device based on information stored in or obtained through the contactless module of the external device, to authenticate a user of the external device based on the information and/or user input, to establish a communication channel between the mobile terminal and the external device based on the information, and to access data or execute an application through the established communication channel.

16 Claims, 3 Drawing Sheets

METHOD AND APPARATUS FOR COMMUNICATING WITH EXTERNAL INTERFACE DEVICE USING CONTACTLESS

The present application is a national stage of PCT/KR2009/005414, filed Sep. 23, 2009, and also claims the benefit of U.S. Provisional Application No. 61/099,879, filed Sep. 24, 2008.

TECHNICAL FIELD

The present invention relates to a method and device for identifying and authenticating another device using a contactless interface, and for establishing a communication channel between the devices through the contactless interface and performing data access and application execution through the established communication channel.

BACKGROUND ART

Mobile terminals such as smart phones, etc. are being developed with the increased capabilities for providing various services and functionalities which are user-friendly. Among the capabilities, the mobile terminal may include a contactless module/interface and a removable storage device or smart card such as a SIM (Subscriber Identity Module) card or USIM (Universal Subscriber Identity Module) card therein, which can be read contactless by a contactless reader. For instance, the smart card may store therein transportation fares and passes, which can be read by metro or train gateways. The smart cards generally use a UICC platform that can support telecommunication applications as well.

When the mobile terminal is in the normal mode where it is powered by the battery, then the contactless module and the removable storage device of the mobile terminal are powered by the battery therein. As such, the contactless module of the mobile terminal can access data from or communicate with the removable storage device or any other terminal resources (e.g., display device, other storage device (mass memory), an internal memory of the terminal).

On the other hand, if the battery is empty or the mobile terminal is turned off, then limited services may be available by the mobile terminal. In that case, the contactless module of the mobile terminal may be powered by the electromagnetic field of a reader that wishes to access data from the mobile terminal. For instance, a contactless reader of an external device may generate electromagnetic fields and thereby power the contactless module of the mobile terminal, which in turn can power the removable storage device such as the SIM or USIM card within the mobile terminal. Then the contactless reader can access data from the removable storage device through the contactless module of the mobile terminal.

DISCLOSURE OF INVENTION

Solution to Problem

The present invention provides enhanced services and applications using contactless interfaces among various devices.

The present invention also allows a device to automatically and contactlessly identify, authenticate, and communicate with another device, for data access and application execution.

The present invention further provides two or more devices to communicate contactlessly with each other, and automatically enter into a locked mode if one of the devices is moved away.

The present invention allows multiple devices to establish communication contactlessly and to be automatically synchronized with each other (e.g., address book in one device can be synchronized or updated to be the same as the address book in another device).

According to one aspect, the present invention provides a mobile terminal comprising: a contactless module configured to communicate contactlessly with an external device; and a controller configured to control the contactless module of the mobile terminal to detect a contactless module of the external device, to identify the external device based on information stored in or obtained through the contactless module of the external device, to authenticate a user of the external device based on the information and/or user input, to establish a communication channel between the mobile terminal and the external device based on the information, and to access data or execute an application through the established communication channel.

According to another aspect, the present invention provides a personal computer comprising: a contactless module configured to communicate contactlessly with a mobile terminal; and a controller configured to control the contactless module of the personal computer to detect a contactless module of the mobile terminal, to identify the mobile terminal based on information stored in or obtained through the contactless module of the mobile terminal, to authenticate a user of the mobile terminal based on the information and/or user input, to establish a communication channel between the personal computer and the mobile terminal, and to access data or execute an application through the established communication channel.

According to another aspect, the present invention provides a personal computer comprising: a contactless module configured to communicate contactlessly with a mobile terminal; and a controller configured to control the contactless module of the personal computer to detect if the mobile terminal is no longer within a preset range of the personal computer, and to automatically switch a current mode of the personal computer to a locked mode when the detection indicates that the mobile terminal is no longer within the preset range of the personal computer.

According to another aspect, the present invention provides a method of contactlessly communicating by a mobile terminal, the mobile terminal including a controller and a contactless module configured to contactlessly communicate with a contactless module of an external device, the method comprising: detecting, by the contactless module of the mobile terminal, the contactless module of the external device; identifying, by the controller, the external device based on information stored in or obtained through the contactless module of the external device; authenticating, by the controller, a user of the external device based on the information and/or user input; establishing a communication channel between the mobile terminal and the external device based on the information; and performing data access and/or application execution through the established communication channel.

These and other features of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention and wherein.

MODE FOR THE INVENTION

Hereinafter, exemplary embodiments of the invention will be described in detail with reference to the attached drawings. The embodiments described below are intended to exemplify the technical spirit of the invention, but are not intended to limit the scope of the invention.

Figure 1:
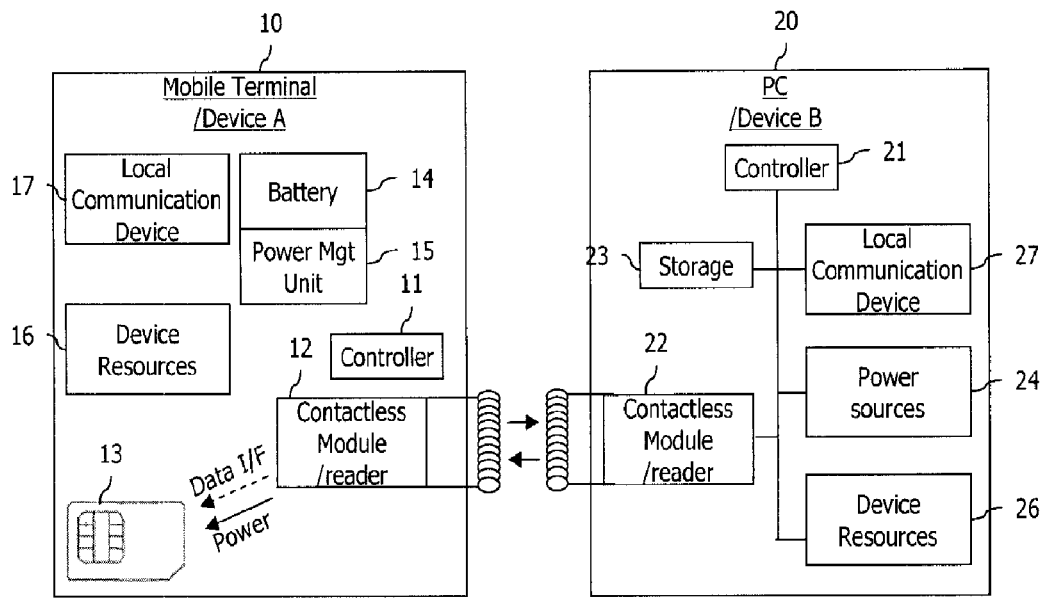
FIG. 1 is a block diagram of a contactless system including devices A and B contactlessly communicating with each other according to an embodiment of the invention.

FIG. 1 is a block diagram of a contactless system including devices A and B contactlessly communicating with each other according to an embodiment of the invention. In this preferred example, the device A (10) is a mobile terminal while the device B (20) is a PC (personal computer). The mobile terminal may be, e.g., a smart phone, pager, PDA (Personal Digital Assistant), UE (user equipment), mobile phone, etc. The PC may be a non-portable or portable device such as a mobile station, desktop, work station, computer notebook, computer tablet, etc. However, in another example, the device A may be the PC while the device B is the mobile terminal. Still in other examples, each of the devices A and B can be any communication device capable of contactless communication.

As shown in FIG. 1, the device B's contactless reader 22 communicates contactlessly with a contactless module 12 of the device A and thereby can read data (e.g., data stored in a storage device 13 or other locations in the device A) through the contactless module 12. Similarly, the contactless reader 12 of the device A can contactlessly communicate with the contactless module 22 of the device B and thereby can read data (e.g., data stored in a storage device 23 or other locations in the device B) through the contactless module 22.

Referring to FIG. 1, the device A (10) includes a controller 11, the contactless module/reader 12, the removable storage device 13 (e.g., smart card, SIM card, USIM card, etc.), a battery 14, a power management unit 15 for supplying power (AC, battery, etc.) to the components of the device A, device resources 16, and local communication device(s) 17. The device resources 16 are various components of the device A, which may include a display unit, a speaker, an input unit, storage unit(s), etc. The local communication device 17 can be a short range communication unit such as a Bluetooth device, a WiFi device, an IRDA (infrared data association) device, etc. for providing short distance communications between the devices A and B, or between the device A and other external device(s). The local communication device 17 may be included in the device resources 16. The controller 11 controls the components of the device A. The contactless module/reader 12 can communicate (e.g., send and receive) contactlessly (e.g., via electronic magnetic fields) with contactless modules/readers in external devices.

The device B (20) also includes a controller 21, the contactless reader/module 22, the storage device 23 such as a removable device or smart card, a power source 24 (AC, battery, etc.) for supplying power to the components of the device B, device resources 26, and local communication device(s) 27. The device resources 26 can be the same or similar components as the device resources 16 of the device A, and can merely be known components of the device A. The local communication device 27 can be a short range communication unit such as a Bluetooth device, a WiFi device, an IRDA device, etc. for providing short distance communications between the devices B and A, or between the device B and other external device(s). The local communication device 27 may be included in the device resources 26. The controller 21 controls the components of the device B. All components of each of the devices A and B are operatively coupled and configured.

The contactless modules/readers 12, 22 can be merely a tag (e.g., USB token or RFID tag) or a contactless module having full contactless functionalities, and can be integrated into the respective device A, B or can be in a device separately connected to the respective device A, B. For example, each of the contactless modules 12, 22 can be or include a RFID (radio frequency identification) tag/module (including, e.g., an IC or chip, antenna, etc.), a proximity card tag/module having contactless integrated circuits, or a NFC (near field communication) tag/module, etc. Further, each of the contactless modules 12, 22 can further include a contactless reader for contactlessly accessing data, applications, etc. stored in an external device, through a contactless module in the external device. Various types of contactless technologies are known and can be used in the contactless modules/readers 12, 22.

Each of the contactless modules/readers 12, 22 can operate in various modes. For instance, the contactless modules/readers 12, 22 may operate in one of the following modes:

Reader mode: initiates transactions and reading operations and provides electromagnetic fields that can power other parts (e.g., contactless module of the other device it is trying to read), Card Emulation mode: answers to a contactless reader (e.g., operating in the reader mode) of another device and even in some cases can be powered by the contactless reader, and Peer to Peer mode (intermediate mode that is made of a combination of the above two modes): during a session, communication can be turned on so that the contactless module can move from the reader mode to the card emulation mode, or vice versa, to enable a proactive communication.

Figure 2:
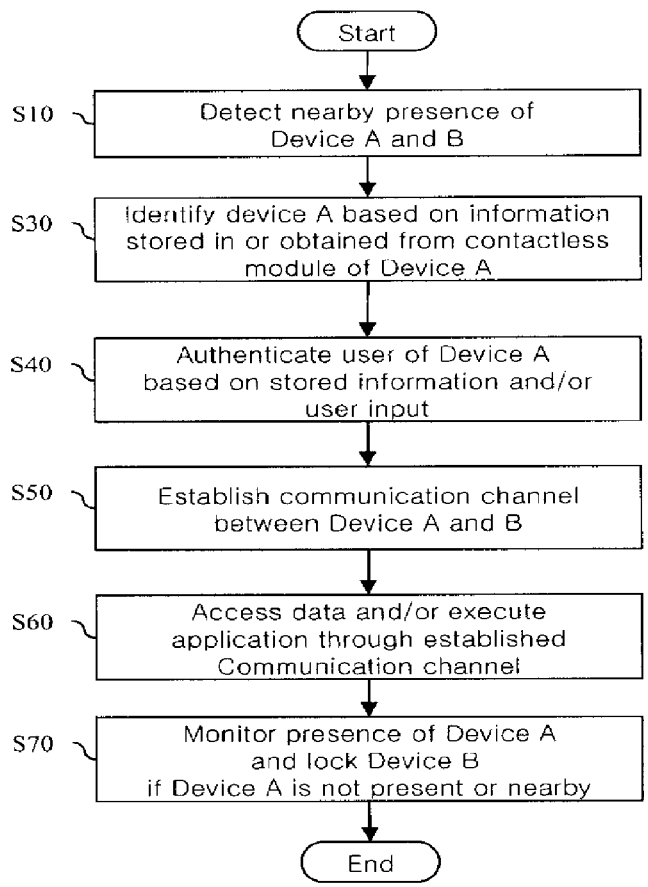
FIG. 2 is a flowchart illustrating a method of contactless communication among the devices A and B according to an embodiment of the invention.

FIG. 2 is a flowchart illustrating a method of contactless communication among the devices A and B according to an embodiment of the invention. The method of FIG. 2 is preferably applied to the system of FIG. 1. This method can, however, be applied to other devices capable of contactless communication.

In the example of FIG. 2, preferably the device A is the mobile terminal while the device B is the PC. However, the method is equally applicable to a scenario where the device B is the mobile terminal and the device A is the PC.

Referring to FIG. 2, at step S10, when two devices (i.e., the devices A and B) are nearby to each other, this nearby presence of the devices A and B is detected. This detection can be done by the device A or device B using the respective contactless module. Then at step S30, the detected device is identified by the detecting device and an application (e.g., Operating Systems) in the PC (device B) may be launched. Steps S10 and S30 for the case where the device A detects the device B, and for another case where the device B detects the device A, will be discussed now in more detail according to the present invention.

Device B Detects Device A

In this case where the device B (PC) detects the near presence of the device A (mobile terminal), the device B is turned on, and the contactless module/reader 22 of the device B supports the reader mode. Further, the device B prestores therein (e.g., in its storage device 23 or other location) one or more contactless tag/module information of external devices including the device A in, e.g., a list of devices associated with the device B. At this point, the device A may only include a RFID tag or any contactless module supporting only the card emulation mode, as its contactless module 12, and in that case, can be preferably switched off (or in the sleep mode) since the device B in the reader mode can generate the magnetic fields to power the contactless module 12 of the device A. That is, even when the device A is turned off, the device B can still power the contactless module 12 of the device A and initiate contactless communication with the device B.

The operation of the device B detecting the nearby presence of the device A is as follows, and is also referred herein as the device B's detection operation. In the device B's detection operation, the contactless reader 22 of the device B checks for a presence of an RF tag or contactless module (or the like) of any external device nearby. This can be performed as the contactless reader 22 operates in the reader mode, can also power any detected RF tag/contactless module, and can occur regularly, at certain intervals, or at desired times according to the settings.

If the device A is nearby (e.g., within the reading range of the contactless reader 22), then the contactless reader 22 of the device B detects the RF tag/contactless module 12 of the device A (S10) and reads information in the RF tag/contactless module 12, which can be powered by the contactless reader 22 for this reading operation, as discussed above. If no desired information is stored or can be found in the RF tag/contactless module 12, then the contactless reader 22 in the reader mode can contactlessly read information stored in the storage device 13 (or any other allocated location) in the device A through the contactless module 12. This information read from the device A may contain a particular tag number or identification of the device A or some information which the device B can use to identify the device A as the device that the device B can communicate with. For instance, this information may be the phone number or ID of the device A (since the device A is assumed in this example to be the mobile terminal) or of the tag in the device A.

Based on this information stored in or obtained from the contactless module 12 which is read by the contactless reader 22, the device B identifies the device A (S30). For instance, the device B (e.g., controller 21) can compare the contactlessly read information with information presorted in the device B to determine if the device A can be identified. Since, e.g., the phone number of the device A is prestored within the device B in the prestored list of devices associated with the device B, then the device B can compare the information (e.g., phone number of the device A as identified in the device A's RFID tag) contactlessly read from the device A with the list, and verify that the currently detected device A is properly associated with the device B, so that further actions can be allowed. If the device B cannot identify the currently detected device A, then no further action may be allowed since the device A is not recognized by the device B or is not a secure device to communicate with. As a part of the identification (optional), the device B may further require a user input to verify the identity of the device A. For instance, the user may need to enter certain information (e.g., user ID or login information) to the device A or B (which ever is turned on for the user to input), and the device B can verify the device A based on the user input.

Once the device B has determined that the device A is a properly identified device, then the OS (operation system) or any designated application/program on the device B may be launched or opened automatically. This may depend on parameters stored on the device B, e.g., depending on settings of the device B. The launching of the application on the device B may also occur with the login of a user. For example, the device B may further require an input of the user's login or some other ID information into the device B for the launching of the application. Further, an input of a password from the user may be further requested to launch the application. As a variation, once the device A is properly identified, the device B may automatically launch an application/program (which may have been pre-designated) associated with the device A based on the information contactlessly read by the contactless reader 22 from the device A. This ends the device B's detection operation.

Device A Detects Device B

In this case where the device A (mobile terminal) detects the near presence of the device B (PC), the device B is turned off or in a sleep mode, and the contactless module/reader 12 of the device A supports the reader mode. Further, the device A prestores therein (e.g., in its storage device 13 or other location) information about external devices including the device B or their contactless tags external devices, which can be prestored in a list of devices associated with the device A. At this point, the device B may only include an RFID tag or any contactless module supporting only the card emulation mode, as its contactless module 22, and can be preferably switched off (or in the sleep mode) since the device A in the reader mode can generate the magnetic fields to power the contactless module 22 of the device B.

Figure 3:
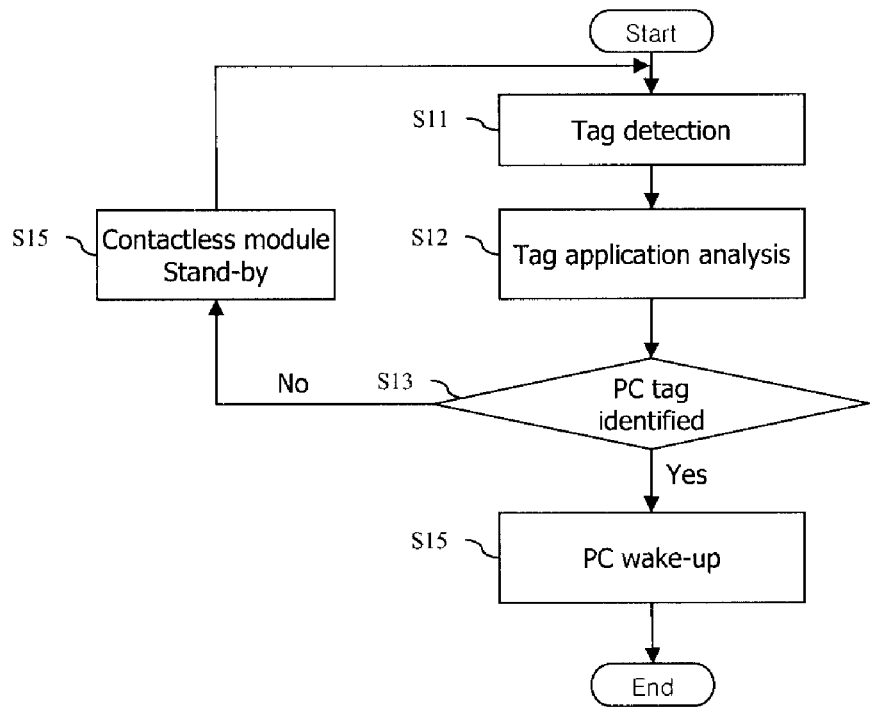
FIG. 3 is a flowchart illustrating a method of waking up the device B according to an embodiment of the invention.

The operation of the device A detecting the nearby presence of the device B is as follows and is referred to herein as the device A's detection operation, which is discussed referring to FIG. 3. The contactless reader 12 of the device A checks for a presence of an RF tag or contactless module (or the like) of any external device nearby at step 11. This can be performed as the contactless reader 12 operates in the reader mode, can also power any detected RF tag/contactless module, and can occur regularly, at certain intervals, or at desired times according to the settings.

If the device B is nearby (e.g., within the reading range of the contactless reader 12), then the contactless reader 12 of the device A detects the RF tag/contactless module 22 of the device B at step S11 (S10 in FIG. 2) and reads and analyzes information in the RF tag/contactless module 22 at step S12, which can be powered by the contactless reader 12 for this reading operation, as discussed above. If no (desired) information is stored or can be obtained from the RF tag/contactless module 22, then the contactless reader 12 in the reader mode can contactlessly read information stored in the storage device 23 (or any other allocated location) of the device B through the contactless module 22. The information read contactlessly from the device B may contain a particular tag number or identification of the device B or some information which the device A can use to identify the device B as the device that the device A can communicate with. For instance, this information may be an ID or serial number of the device B or the tag in the device B.

Based on the information read contactlessly by the contactless reader 22, the device A identifies the device B at step S13 (S30 in FIG. 2). For instance, the device A (e.g., controller 11) can compare the contactlessly read information with information prestored in the device A to determine if the device B can be identified at step S12. Since, e.g., the ID information of the device B is prestored within the device A as part of the prestored list of devices associated with the device A, then the device A can compare the information (e.g., ID information of the device B) contactlessly obtained from the device B with the prestored list, and verify that the currently detected device B is properly associated with the device A, so that further actions can be allowed. If the device A cannot identify the currently detected device B at step S13, then no further action may be allowed and the contactless module 12 is placed in the standby mode at step S14 since the device B is not recognized by the device A or is not a secure device to communicate with. As a part of the identification (optional), the device A may further require a user input to verify the identity of the device B. For instance, the user may need to enter certain information (e.g., user ID or login information) to the device A or B (which ever is turned on for the user to input), and the device A can verify the device B based on the user input. On the other hand, if the device A can properly identify the currently detected device B at step S13, then the device A requests and wakes up the device B (PC) at step S15. The waking up process can occur by the device A transmitting a wake-up request signal to the device B.

After step S15, the device B's detection operation discussed above is performed, which is not repeated herein. In that case, since the device B is woken up, both the devices A and B may be turned on and operating.

As a variation, after step S15, a designated application/program on the device A may be launched or opened automatically. This may depend on parameters stored on the device A, e.g., depending on settings of the device A. The launching of the application on the device A may also occur with the login of a user (e.g., input to the device A or B). For instance, the device A may further require an input of the user's login or some other ID information into the device A for the launching of the application. Further, an input of a password from the user may be further requested to launch the application. As a variation, once the device B is properly identified, the device A may automatically launch an application/program (which may have been pre-designated) associated with the device B based on the information contactlessly read by the contactless reader 12 of the device A. This ends the device A's detection operation.

Returning to FIG. 2, after step S30 (e.g., after the device has been properly identified (but before the application such as OS is launched) or after the application has been launched), the user's identity is authenticated based on various information including the information contactlessly read and/or on a user input at step S40. There user here preferably be is the user carrying the device A (mobile terminal), but can be the user of the device B.

The user's identify at step S30 may be authenticated by one or more of the following:
simple device detection (e.g., detection of the device A or B as discussed above);
combination of the device detection and password (e.g., input by the user or obtained from the contactless tag);
combination of the device detection and login/password entered to the device A or B via the respective input unit; and/or
combination of the device detection and any other authentication such as biometrics.

For example, if the user carrying the device A (mobile terminal) approaches the device B and steps S10 and S30 are performed, then the user may need to enter the login and/or password into the device B (or A if turned on) in which case the device B (or A) can verify the user's identity based on the entered information. To do this, the verifying device (e.g., device B) can prestore the user's login and/or password information in association with the detected device (e.g., device A), which has been identified at step S30 based on the contactlessly read information. As a variation, the user's identification may be authenticated based on the information stored in the contactless tag 12 or 22 or storage device 13 or 23.

It may be desirable to verify the user's identity based on, e.g., login password, before the process can continue and have it as a default setting, in case the user loses his or her device A such as the mobile terminal.

At step S50, once the user's identity has been authenticated, a communication channel between the devices A and B is established, and through the established communication channel, the device A and/or B can access, update, synchronize, and process data from the other device, can launch application(s) stored in the other device, etc. at step S60. Step S50 and/or step S60 can occur automatically after step S30 or S40. Depending on the existence of the local communication device 17, 27 or the type of the local communication device 17, 27 (e.g., WiFi, Bluetooth, IRDA, etc.) and the nature and/or volume of data/application to be transmitted, the local communication device 17, 27 can be used in lieu of or in addition to the contactless modules 12, 22 in step S60.

For instance, if the contactless link (contactless modules 12, 22), which can be a NFC (near field communication) link, can communicate a large volume of data, then the communication channel can be established through the contactless link. This can be realized as the device B operates in the reader mode or in the peer to peer mode depending on the availability of these modes. Once the secured communication channel is established contactlessly, then the device B can access data stored in the storage device 13 (e.g., smart card), the contactless module 12, the device resources 16 or other location in the device A through the established communication channel. In another example, the device A can access data stored in the storage device 23, the contactless module 22, the device resources 26 or other location in the device B if desired, through the established communication channel.

If, however, the contactless link is not strong or is not adapted for such communication, then the local communication device 17 or 27 may be used (e.g., WiFi, Bluetooth, IRDA, etc.) to establish a communication channel based on the information stored in the device A or B Technologies associated with the local communication devices 17, 27 are known; however, the invention utilizes the information contactlessly read by the contactless reader to establish such communication channel. For instance, the local communication device 27 can establish a communication channel with the local communication device 17 based on the information contactlessly read by the contactless reader 22 and/or based on information stored in the storage device 13 (which can be contactlessly read), the device resources 16, the contactless module 12, or any other location in the device A.

Figure 4:
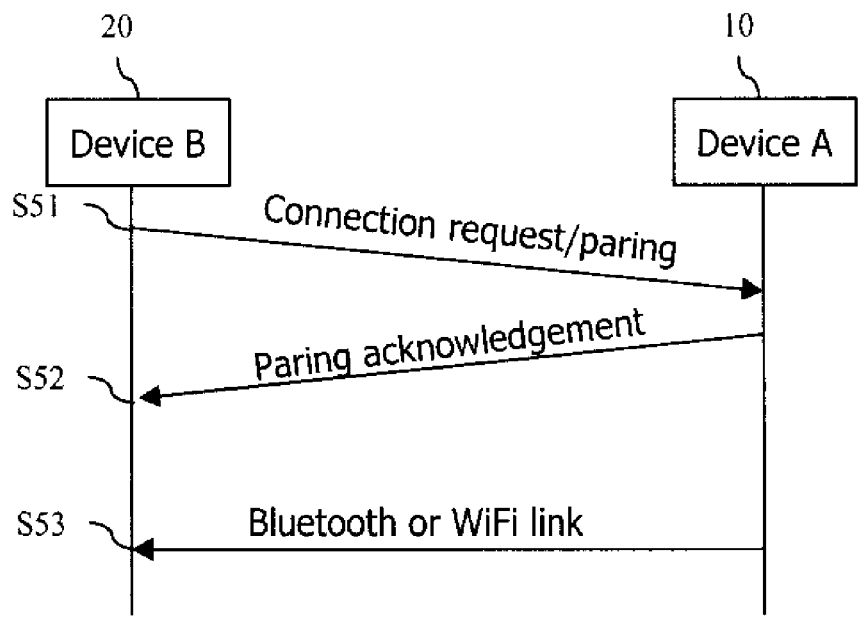
FIG. 4 is a diagram illustrating a method of establishing a Bluetooth or WiFi link between the devices A and B according to examples of the invention.

For example as shown in FIG. 4, if the local communication devices 17 and 27 are Bluetooth devices, then the Bluetooth paring can be made automatically based on the information read contactlessly, e.g., from the RFID tags of the devices A and B. That is, as shown in step S51, the device B (PC) can send a Bluetooth connection request/pairing to the device A (mobile terminal), and the device A sends an acknowledgement response to the device B in step S52. Since the Bluetooth pairing can be automatically identified already by the detection and reading of the RFID tags of the devices A and B, there is no need to enter any additional keys to establish the Bluetooth paring. As a result, the Bluetooth communication between the devices A and B is established easily based on the information already contactlessly obtained, at step S53.

In another example as shown in FIG. 4, if the local communication devices 17 and 27 are WiFi devices, then the WiFi connection between the devices A and B can be established automatically in the same way as the Bluetooth connection. That is, in step S51 the device B sends a WiFi connection request/pairing to the device A, the device A sends an acknowledgement response to the device B in step S52, and thus the WiFi connection between the devices A and B is established in step S53. As a variation, for a better security, the WiFi connection can be established based on ESSID (Extended Service Set Identifier used in, e.g., IEEE 802.11 wireless networking) and login information from the RFID tag(s) but the device B may further require the user's input of the password.

Figure 5:
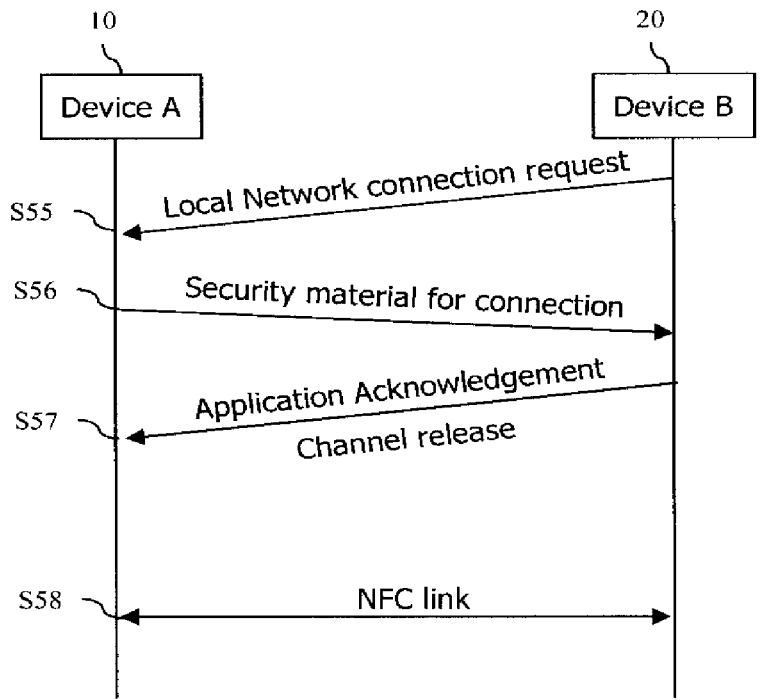
FIG. 5 is a diagram illustrating a method of establishing a NFC link between the devices A and B according to another example of the invention.

In still another example as shown in FIG. 5, a NFC (Near Field Communication), which is a short range wireless communication, can be established between the devices A and B. In step S55, the device B can send a local network connection request (e.g., NFC connection) to the device A. In step S56, the device A sends security data for such connection to the device B, which is then acknowledged by the device B in step S57. The device B opens the NFC channel and thus the NFC link between the devices A and B is established in step S58.

In the various operations shown in FIGS. 4 and 5, these operations may be performed using the local communication devices 17, 27 under control of the controllers 11, 21 of the devices A and B. Further, if multiples links (e.g., both Bluetooth and WiFi) are available, then the device can be set up to select one most suitable link to establish the communication channel, e.g., based on the application/data size compared to the capability of the various links.

Once the communication channel between the devices A and B is established in step S50 of FIG. 2, then data can be accessed, applications can be launched, or other operations can be performed as in step S60. For instance, a phone book synchronization can be automatically performed between the devices A and B. In another example, contents can be pushed to the device A or B (e.g., podcasts, games, etc.). In still another example, interacting with applications such as MSN can be implemented, which can be used to inform others (e.g., colleagues/network) of the presence of the user at the user's device such as device A or B.

Returning to FIG. 2, at step S70, the device B can check for the presence/proximity of the device A and can place the device B in a standby or sleep or locked mode if the device A is moved away from the device B. This detection can be made at certain instances or regular intervals. For instance, during the operation of FIG. 2 (e.g., at any step in FIG. 2), the device B (PC) may monitor the presence or proximity of the device A (mobile terminal). If the device B determines that the device A is not present or nearby (e.g., outside a certain range of the device B) due to, e.g., the user carrying the device A has left the user's desk area or office away from the device B, then the device B is switched to the locked mode so that the device B can be secured and protected. This can be established via the NFC link or contactless modules. An example of step S70 will now be discussed in more detail referring to FIG. 6.

Figure 6:
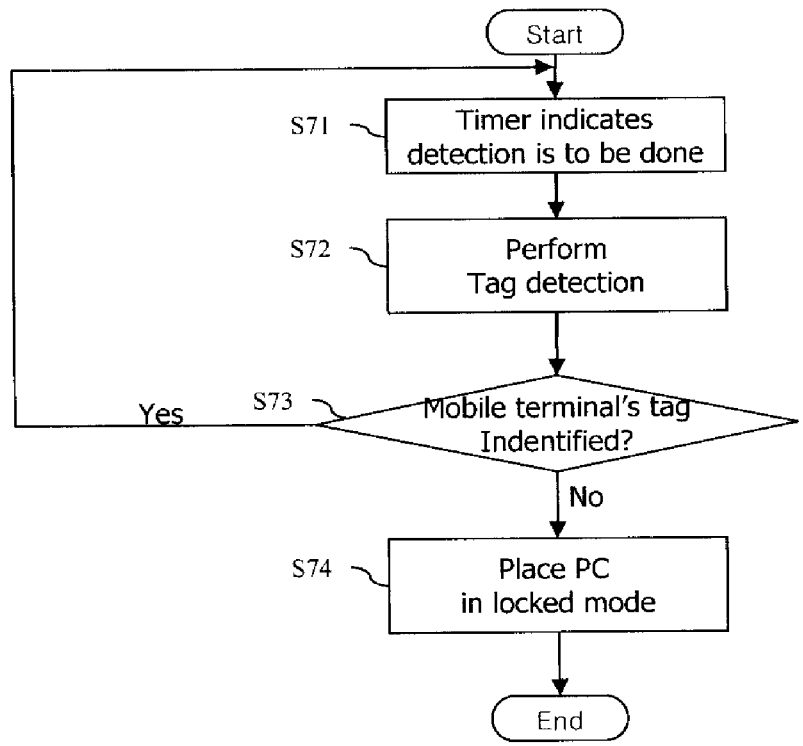
FIG. 6 is a flowchart illustrating an example of an operation involved in step S70 of FIG. 2 according to an embodiment of the invention.

As shown in FIG. 6, a timer in the device B (PC) can be set such that checking for the presence/proximity of the device A (mobile terminal) can be made at certain intervals. In step S71, the timer in the device B indicates that the device detection is to be made. Then in step S72, the device B looks for the nearby presence of the device A by, e.g., searching for the device A's RFID tag nearby. If the device A's tag is not detected/identified in step S73 (e.g., the device A is moved away from the device B outside a certain range), then the device B is placed in the locked mode in step S74. That is, if the device B cannot detect the presence of the device A nearby, then the device B places itself in the locked mode so that the device B is secured and no other access thereto may be made. Thereafter, the device B in the locked mode continuously or at regularly checks for the presence of the device A and if the device A returns within the range of the device B, then the device B may release the locked mode and return to the previous mode or other operating mode. For the device B to release the locked mode, an additional user input (e.g., password) may be needed.

The method of FIG. 2 has been described above referring to the example where the device A is a mobile terminal and the device B is a PC. However, the invention is not limited thereto and the method of FIG. 2 can be equally applied to scenarios where the device A is a PC and the device B is a mobile terminal, or where the devices A and B are other suitable devices. For instance, the device A or B may be an alarm system in a house, a home entertainment system, a kiosk located in a public location, etc.

According to the various examples and embodiments, the present invention creates an easy and secure path to connect to a device (e.g., PC or mobile terminal) using contactless interfaces. The invention has various advantageous applicability. For instance, a user carrying a mobile phone can put the phone close to his computer, which in turn can automatically identify the user. A channel between the computer and the mobile phone can be established to further authenticate the user according to the invention. Then the user only may have to enter a password to be logged on his computer. Thus, by merely placing the user's mobile terminal nearly the user's PC, the login process in the PC is simplified according to the invention. In another example, if the user carrying her mobile phone leaves her office, then when the user is outside a range of contactless reception of the user's PC, the PC may be automatically locked until the user gets back to her computer or within the range according to the invention so that the PC can be secured easily. In still another case, if the user carrying the mobile terminal nears her PC, then a communication channel between the mobile terminal and PC is automatically established after the device detection, identification, and/or user's authentication, and various applications or programs may be automatically launched and completed according to the invention. For example, data (e.g., phone book address, websites, or other data) between the mobile terminal and PC may be automatically synchronized easily via the contactless modules 12, 22 of the devices.

The present invention has been explained with reference to the embodiments which are merely exemplary. It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A mobile terminal, comprising:
a contactless module configured to communicate contactlessly with an external device; and
a controller configured to:
establish an identification channel between the mobile terminal and the external device by using power generated from an RF (radio frequency) field;
perform identification procedures through the established identification channel; and
establish a communication channel between the mobile terminal and the external device after the identification procedures are completed,
wherein the communication channel is same as the identification channel when a volume of data is less than or equal to a capacity of the identification channel, and
wherein the communication channel is one of: a WiFi (Wireless Fidelity) channel, a Bluetooth channel, or a IRDA (Infrared Data Association) channel, when the volume of the data is greater than the capacity of the identification channel.

2. The mobile terminal of claim 1, wherein the identification channel is an RFID (Radio Frequency Identification) channel or an NFC (Near Field Communication) channel.

3. The mobile terminal of claim 1, wherein the external device is a personal computer.

4. The mobile terminal of claim 1, wherein:
the mobile terminal is in an insufficient operation mode; and
the insufficient operation mode is determined if at least one condition is satisfied among those indicating that the mobile terminal is in battery off mode, the battery is too low, the battery is empty, the battery is inoperable, the battery is broken, and the battery is detached.

5. The mobile terminal of claim 1, wherein the identification procedures includes:
transmitting an identification message to the external device through the identification channel; and
receiving an identification response message from the external device in response to the identification message.

6. The mobile terminal of claim 1, wherein the RF field is received from the external device.

7. The mobile terminal of claim 1, wherein the power generated from the RF field is used for identification procedures.

8. The mobile terminal of claim 1, the controller is further configured to tranceive the data through the established communication channel.

9. A method of contactlessly communicating by a mobile terminal, the mobile terminal including a controller and a contactless module configured to contactlessly communicate with a contactless module of an external device, the method comprising:
establishing an identification channel between the mobile terminal and the external device by using power generated from an RF (radio frequency) field;
performing identification procedures through the established identification channel; and
establishing a communication channel between the mobile terminal and the external device after the identification procedures are completed,
wherein the communication channel is same as the identification channel when a volume of the data is less than or equal to a capacity of the identification channel, and
wherein the communication channel is one of: a WiFi (Wireless Fidelity) channel, a Bluetooth channel, or a IRDA (Infrared Data Association) channel, when the volume of the data is greater than the capacity of the identification channel.

10. The method of claim 9, wherein the identification channel is an RFID (Radio Frequency Identification) channel or an NFC (Near Field Communication) channel.

11. The method of claim 9, wherein the external device is a personal computer.

12. The method of claim 9, wherein:
the mobile terminal is in an insufficient operation mode; and
the insufficient operation mode is determined if at least one condition is satisfied among those indicating that the mobile terminal is in battery off mode, a battery is too low, the battery is empty, the battery is inoperable, the battery is broken, and the battery is detached.

13. The method of claim 9, wherein the identification procedures include:
transmitting an identification message to the external device through the identification channel; and
receiving an identification response message from the external device in response to the identification message.

14. The method of claim 9, wherein the RF field is received from the external device.

15. The method of claim 9, wherein the power generated from the RF field is used for identification procedures.

16. The method of claim 9, further comprising tranceiving the data through the established communication channel.

* * * * *